Figure 3:
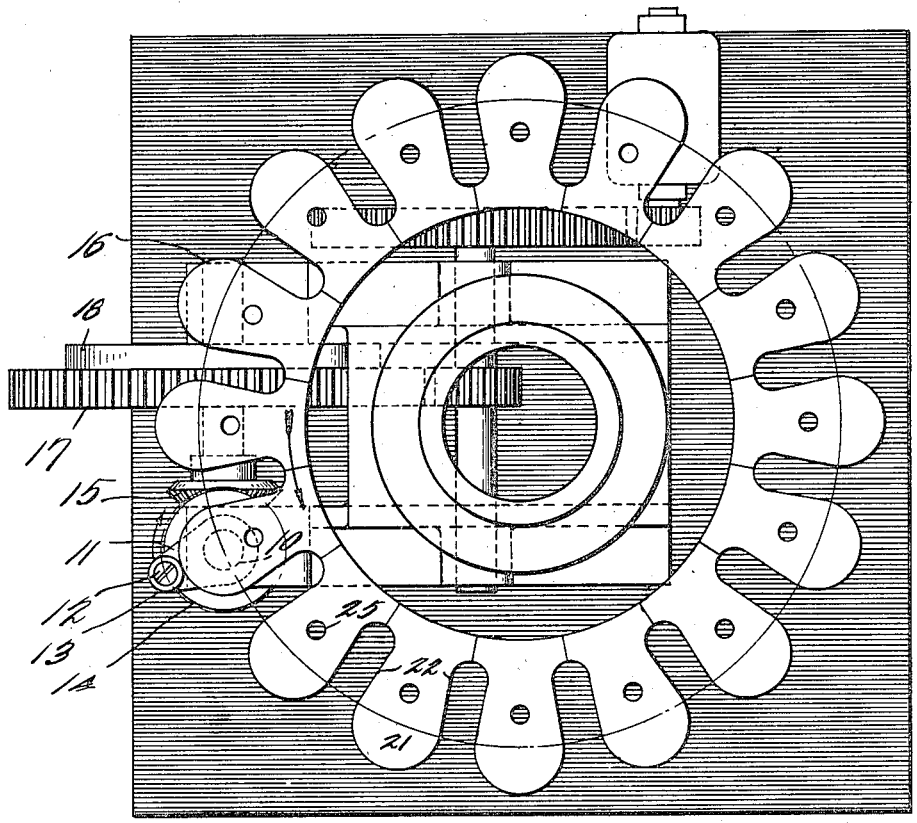

L. L. LUDINGTON.
MECHANICAL MOVEMENT.
APPLICATION FILED JUNE 2, 1917.
1,252,823.
Patented Jan. 8, 1918.
2 SHEETS—SHEET 1.
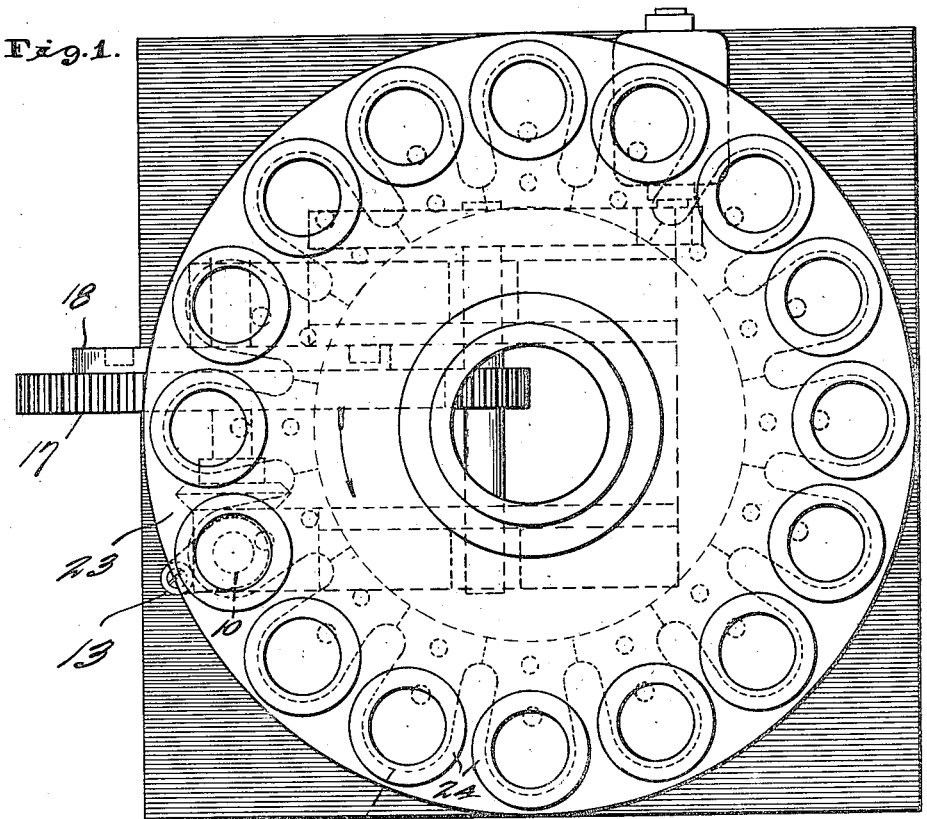
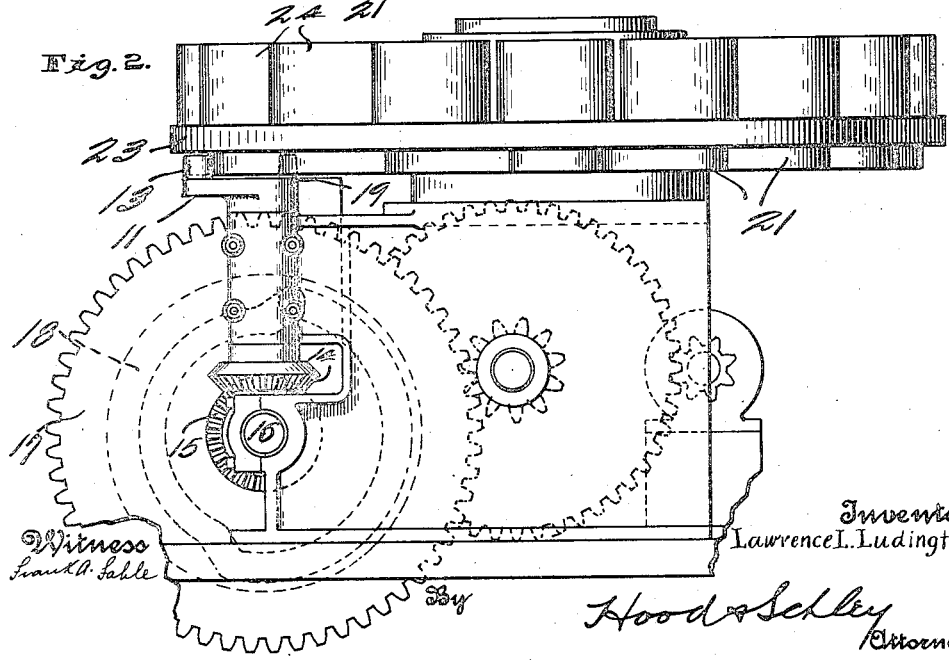
Inventor
Lawrence L. Ludington,

L. L. LUDINGTON.
MECHANICAL MOVEMENT.
APPLICATION FILED JUNE 2, 1917.

1,252,823.

Patented Jan. 8, 1918.
2 SHEETS—SHEET 2.

Witness
Frank O. Fahle

Inventor
Lawrence L. Ludington,
By Hood & Schley
Attorneys

UNITED STATES PATENT OFFICE.

LAWRENCE L. LUDINGTON, OF MUNCIE, INDIANA, ASSIGNOR TO BALL BROTHERS GLASS MANUFACTURING COMPANY, OF MUNCIE, INDIANA, A CORPORATION OF INDIANA.

MECHANICAL MOVEMENT.

1,252,823.  Specification of Letters Patent.  Patented Jan. 8, 1918.

Application filed June 2, 1917. Serial No. 172,381.

*To all whom it may concern:*

Be it known that I, LAWRENCE L. LUDINGTON, a citizen of the United States, residing at Muncie, in the county of Delaware and State of Indiana, have invented a new and useful Mechanical Movement, of which the following is a specification.

The object of my invention is to provide a pair of rotary coacting elements of such form that continuous rotary movement of one of said elements will result in intermittent step by step rotary movement of the other element without jar either in starting or stopping and without possibility of overthrow. The apparatus has been primarily designed for the intermittent step by step advancement of heavy rotary tables, such as are commonly used in glass-working machines, but it will be readily understood that my invention resides in the peculiar gearing or mechanical movement and is applicable to many uses.

The accompanying drawings illustrate my invention. Figure 1 is a plan of an apparatus embodying my invention; Fig. 2 a side elevation; Fig. 3 a plan with the portion of the gearing elements. removed so as to show the coöperative relation of the gearing elements.

In the drawings, 10 indicates a rotary shaft provided with a crank 11 carrying a wrist pin 12 upon which is mounted a roller 13. The shaft 10 may be rotated in any desired manner and by any desired means.

In the present instance, it is rotated by means of a bevel gear 14 carried by shaft 10, and a bevel gear 15 carried by a shaft 16 upon which is mounted a gear 17 and a cam 18. Cam 18 is adapted to vertically reciprocate a locking pin 19 the purpose of which will appear. The crank 11 and its wrist pin 12 forms one of the primary elements of my improved gearing or mechanical movement. The other element comprises a rotary member, the axis of which is preferably parallel with the axis of shaft 10 and which carries a circular series of teeth 21, each of which has an outer end which is a circular arc in plan, having a radius substantially equal to the distance between the center of the shaft 10 and the nearest point on the surface of roller 13. Subtending the circular arc end of each tooth 21 are converging sides 22 which are parallel with the adjacent sides of the adjacent teeth and spaced apart therefrom a distance substantially equal to the diameter of roller 13. The teeth 21 are arranged in a circular series with the centers of their arc-shaped ends on a circle whose center is the center of rotation of the series and which may be conveniently termed the pitch line of this element of my improved gearing.

In the drawings, I have shown this circular series of teeth 21 attached to, or carried by, a heavy rotary horizontal table 23 rotatably supported upon a suitable support and carrying a multiplicity of molds 24 for the reception and molding of molten glass, and the two elements of my gearing are assembled in such manner that the axis of shaft 10 will intersect the pitch circle of the circular series of teeth 21, the roller 13 being thus tangentially in contact with the edge of one of the teeth 21. Shaft 10 may be rotated in either direction.

Assuming the parts to be in the positions indicated in Fig. 3, and shaft 10 to be rotated in the direction indicated by the arrow and adjacent roller 13, it will be seen that roller 13 will first sweep around the circular end of the adjacent teeth 21 and that during this movement there will be no movement of the element to which the teeth 21 are attached. As soon, however, as roller 13 reaches an end of the circular arc of the tooth and contacts with the adjacent edge 22, the table carrying teeth 21 will begin to be advanced under the driving action of roller 13. The beginning of this movement will be very gradual however, because the tangential component relative to the center of table 23 is, at the beginning, very small but this tangential component will increase rapidly, as shaft 10 continues its rotation. It will be noticed that as soon as roller 13 enters between adjacent edges 22, the table is locked against independent movement and as the rotation of shaft 10 continues, the forward velocity of table 23 continues to increase until the axis of roller 13 reaches the radius between the axis of table 23 and the axis of shaft 10. Therefore, as rotation of shaft 10 continues, the velocity of table 23 gradually decreases until roller 13 passes out from between adjacent edges 22 and proceeds forwardly into contact with the circular end of the next tooth 21 at which time the forward velocity of table 23 has been reduced to zero. Even after roller 13 passes out from between adjacent edges 22, there is no possibility of any independent forward movement of table 23 because roller 13 is in contact with the forward portion of the circular edge of the next tooth 21 to the rear and there can be no independent forward movement of table 23 until roller 13 reaches the position shown in Fig. 3 relative to any one tooth 21.

Under some conditions, in machines such as glass-working machines like that illustrated in the drawings, there might possibly be an accidental misplacement of table 23 under some force other than that applied by roller 13 and, therefore, if desired, the locking pin 19 may be provided, said locking pin entering and withdrawing from the appropriate one of a series of holes 25, one of which is formed in each tooth 21.

Crank 11 and its wrist pin may properly be considered as a single-tooth gearing, forming one of the essential elements of my invention, while the other element is a multi-tooth gear having as many teeth as may be desired, each tooth comprising a circular arc end and two converging sides which are parallel with similar sides of adjacent teeth. The axis of the single-tooth gear intersects the pitch line of the multi-tooth gear.

I claim as my invention:

1. A mechanical movement comprising a rotatable crank provided with a wrist pin and a coöperating rotatable element comprising a circular series of teeth, each of which has a circular end having a radius substantially equal to the radial distance between the crank axis and the wrist pin and having subtending converging sides parallel with the adjacent sides of adjacent teeth and spaced therefrom a distance substantially equal to the diameter of the wrist pin.

2. A mechanical movement comprising a rotatable crank having a wrist pin, and a coöperating circular series of teeth having a pitch circle intersected by the axis of the crank and having converging side edges which are substantially parallel to adjacent edges of adjacent teeth and spaced therefrom a distance substantially equal to the diameter of the wrist pin.

In witness whereof, I have hereunto set my hand at Muncie, Indiana, this eighth day of May, A. D. one thousand nine hundred and seventeen.

LAWRENCE L. LUDINGTON.